US010819048B2

(12) United States Patent
Kanamori et al.

(10) Patent No.: US 10,819,048 B2
(45) Date of Patent: Oct. 27, 2020

(54) ELECTRICAL CONNECTION BOX

(71) Applicant: YAZAKI CORPORATION, Tokyo (JP)

(72) Inventors: Takanori Kanamori, Kakegawa (JP); Kei Fujimoto, Kakegawa (JP); Kenji Segawa, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/716,425

(22) Filed: Dec. 16, 2019

(65) Prior Publication Data

US 2020/0212606 A1  Jul. 2, 2020

(30) Foreign Application Priority Data

Dec. 28, 2018 (JP) .................................. 2018-247801

(51) Int. Cl.
*H01R 9/16* (2006.01)
*H01R 13/627* (2006.01)
*H01R 13/73* (2006.01)

(52) U.S. Cl.
CPC ........... *H01R 9/16* (2013.01); *H01R 13/6271* (2013.01); *H01R 13/73* (2013.01)

(58) Field of Classification Search
CPC ....... H01R 9/16; H01R 13/6271; H01R 13/73
USPC ................................................. 439/737, 76.2
See application file for complete search history.

(56) References Cited

U.S. PATENT DOCUMENTS

| 5,403,193 A | 4/1995 | Ito et al. |
| 6,159,033 A * | 12/2000 | Oka .................... B60R 16/0238 439/350 |
| 6,354,846 B1 * | 3/2002 | Murakami ............. H01R 9/226 439/148 |
| 6,383,035 B1 * | 5/2002 | Kasai .................... H01R 9/2458 439/724 |
| 6,443,779 B2 * | 9/2002 | Suzuki ................. H01R 9/2425 439/557 |
| 6,494,722 B1 * | 12/2002 | Sakamoto ........... B60R 16/0207 439/404 |

(Continued)

FOREIGN PATENT DOCUMENTS

| EP | 2 579 408 A2 | 4/2013 |
| JP | 2013-85340 A | 5/2013 |
| WO | 2018/021085 A1 | 2/2018 |

*Primary Examiner* — Harshad C Patel
(74) *Attorney, Agent, or Firm* — Kenealy Vaidya LLP

(57) ABSTRACT

An electrical connection box is provided. The electrical connection box includes a case having a bottom plate having a terminal connection portion, a cover having a top plate and assembled by being covered on an upper portion of the case, and a plurality of component mounting portions provided on the top plate of the cover. A component including a terminal is assembled in the component mounting portion from above the cover. The terminal of the component assembled to the component mounting portion is connected to the terminal connection portion of the case. At least one boss for maintaining a distance between the bottom plate of the case and the top plate of the cover is provided on the case or the cover. The boss is disposed in a component mounting area surrounded by an outer periphery of the plurality of component mounting portions in a plan view.

4 Claims, 10 Drawing Sheets

(56) References Cited

U.S. PATENT DOCUMENTS

| | | | |
|---|---|---|---|
| 6,524,136 B2 * | 2/2003 | Kawaguchi | B60R 16/0239 439/620.26 |
| 6,561,822 B2 * | 5/2003 | Depp | H05K 7/026 439/521 |
| 6,796,808 B2 * | 9/2004 | Hosoe | H01R 9/226 361/826 |
| 6,870,096 B2 * | 3/2005 | Suzuki | H05K 7/026 174/50 |
| 6,923,660 B2 * | 8/2005 | Takeuchi | H01R 13/506 439/76.2 |
| 6,926,541 B2 * | 8/2005 | Takeuchi | H01R 9/223 439/76.2 |
| 7,375,981 B2 * | 5/2008 | Dickson | B60R 16/0238 361/627 |
| 7,591,653 B2 * | 9/2009 | Boileau | H01R 4/06 439/76.2 |
| 7,666,006 B2 * | 2/2010 | Hashikura | H05K 7/026 439/76.2 |
| 7,784,179 B2 * | 8/2010 | Takeuchi | H01R 9/223 29/876 |
| 7,950,931 B2 * | 5/2011 | Nakanishi | H02G 3/088 439/76.2 |
| 7,955,133 B2 * | 6/2011 | Scheele | H05K 7/026 439/620.27 |
| 8,348,679 B2 * | 1/2013 | Lee | B60R 16/0238 439/76.2 |
| 9,197,048 B2 * | 11/2015 | Sugimoto | B60R 16/0238 |
| 2002/0006742 A1 * | 1/2002 | Hara | H05K 1/056 439/76.2 |
| 2004/0043647 A1 * | 3/2004 | Takeuchi | H01R 13/506 439/76.2 |
| 2017/0311460 A1 | 10/2017 | Ozaki | |
| 2019/0239378 A1 | 8/2019 | Chaen et al. | |

* cited by examiner

ELECTRICAL CONNECTION BOX

CROSS-REFERENCE TO RELATED APPLICATIONS

This application is based on and claims priority under 35 USC 119 from Japanese Patent Application No. 2018-247801 filed on Dec. 28, 2018, the contents of which are incorporated herein by reference.

TECHNICAL FIELD

The present invention relates to an electrical connection box.

BACKGROUND ART

In an electrical connection box in which a case and a cover (the other case) are assembled by covering the cover on an upper portion of the case, a positioning boss provided on the case is fitted into, for positioning, a positioning recess of a cylindrical body protruding on an outer surface of the cover (with reference to Patent Literature 1, for example).

CITATION LIST

Patent Literature

Patent Literature 1: JP-A-2013-85340

SUMMARY OF INVENTION

The electrical connection box is provided with the positioning boss and the positioning recess that are fitted to each other at both ends thereof. Therefore, in an area of the cover where a component is to be mounted, a top plate of the cover is not sufficiently supported, and the top plate may be bent due to a load applied when the component is mounted on the cover. Accordingly, a connection between a terminal of the component mounted on the cover and a terminal connection portion in the electrical connection box is unstable, and the reliability may be lowered.

The present invention has been made in view of the above circumstances, and an object thereof is to provide a highly reliable electrical connection box that allows a stable connection between a terminal of the component to be mounted and a terminal connection portion.

In order to achieve the above object, the electrical connection box according to the present invention is characterized by the following (1) to (4).
(1) An electrical connection box includes:
  a case which includes a bottom plate on which a terminal connection portion is provided;
  a cover which is assembled by being covered on an upper portion of the case and includes a top plate; and
  a plurality of component mounting portions which are provided on the top plate of the cover and on each of which a component including a terminal is assembled from above the cover,
  wherein the terminal of the component assembled to the component mounting portion is connected to the terminal connection portion of the case,
  wherein at least one boss for maintaining a distance between the bottom plate of the case and the top plate of the cover is provided on the case or the cover, and
  wherein the boss is disposed in a component mounting area surrounded by an outer periphery of the plurality of component mounting portions in the plan view.
(2) In the electrical connection box described in (1), the boss is disposed in a range of the component mounting portions in the plan view.
(3) In the electrical connection box described in (1) or (2), the component mounting portion includes a peripheral wall portion by which a periphery of the component to be assembled is surrounded.
(4) In the electrical connection box described in any one of (1) to (3), the boss is erected on the bottom plate of the case, and
  a positioning hole, into which a positioning pin provided on a jig on which the case is placed is inserted, is formed on a back surface of the bottom plate of the case at a position corresponding to the boss.

According to the electrical connection box configured as in the above (1), the boss for maintaining the distance between the bottom plate of the case and the top plate of the cover is arranged in the component mounting area within which the outer periphery of the plurality of component mounting portions is surrounded, in the plan view. Accordingly, a load when assembling the components to the component mounting portions can be reliably received by the boss and deformation such as the bending of the cover and the case due to the load during assembly of the components can be satisfactorily prevented.

Therefore, the terminal of the component can be smoothly and stably inserted into the terminal connection portion of the case with a preset insertion amount, and the connection reliability can be improved. The deformation of the cover and the case is prevented, thus disengagement of locking portions for locking the cover and the case can be prevented, and the assembled state of the cover and the case can be reliably maintained.

According to the electrical connection box configured as in the above (2), since the boss is arranged in the range of the component mounting portions in the component mounting area in the plan view, the load when mounting the component to the component mounting portion can be received by the boss immediately below the component. Accordingly, an effect of preventing the deformation of the cover and the case can be further enhanced.

According to the electrical connection box configured as in the above (3), the peripheral wall portion can satisfactorily hold the periphery of the component mounted on the component mounting portion. Moreover, since the bending of the cover is prevented, it is possible to prevent a problem that the peripheral wall portion tilts and presses an outer peripheral surface of the component as the top plate of the cover is deformed.

According to the electrical connection box configured as in the above (4), the case can be positioned on the jig by inserting the positioning pin of the jig into the positioning hole. Accordingly, assembling work of the terminal connection portion and the cover to the case and mounting work of the component to the component mounting portion can be performed smoothly. Moreover, since the positioning hole is provided at a position corresponding to the boss, the positioning hole can be formed by hollowing out the boss and the cost increase and space occupation due to the provision of a separate positioning hole in the case can be prevented. Due to a configuration in which the cover is covered on the case, the case can be easily positioned even when an outer peripheral surface of the case cannot be positioned by abutting the positioning pin or the like.

According to the present invention, a highly reliable electrical connection box that allows a stable connection between the terminal of the component to be mounted and the terminal connection portion can be provided.

The present invention has been briefly described above. Further, details of the present invention will be clarified by reading a mode (hereinafter, referred to as "embodiment") for carrying out the present invention to be described below with reference to the accompanying drawings.

BRIEF DESCRIPTION OF DRAWINGS

FIGS. 5A and 5B are views showing the electrical connection box, wherein FIG. 5A is a plan view, and FIG. 5B is a side view.

FIGS. 6A and 6B are views showing an internal structure of the electrical connection box, wherein FIG. 6A is a cross-sectional view taken along a line B-B in FIG. 5B and FIG. 6B is a cross-sectional view taken along a line A-A in FIG. 5A.

FIGS. 7A and 7B are views showing an internal structure of an electrical connection box according to a first modification, wherein FIG. 7A is a cross-sectional view taken along a line B-B in FIG. 5B and FIG. 7B is a cross-sectional view taken along a line A-A in FIG. 5A.

FIGS. 9A and 9B are views showing the electrical connection box according to the second modification, wherein FIG. 9A is a plan view, and FIG. 9B is a side view.

FIGS. 10A and 10B are views showing an internal structure of the electrical connection box according to the second modification, wherein FIG. 10A is a cross-sectional view taken along a line D-D in FIG. 9B and FIG. 10B is a cross-sectional view taken along a line C-C in FIG. 9A.

DESCRIPTION OF EMBODIMENTS

Hereinafter, embodiments according to the present invention will be described with reference to the drawings.

Figure 1:
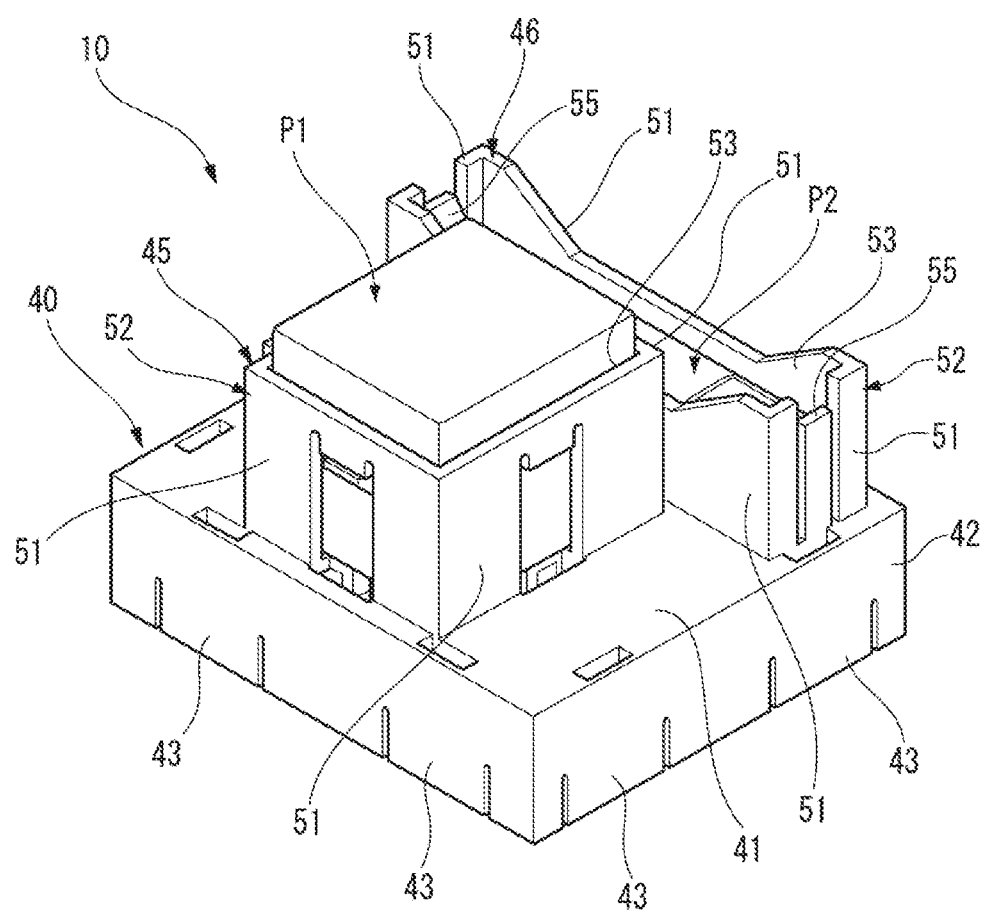
FIG. 1 is a perspective view of an electrical connection box according to an embodiment.
Figure 2:
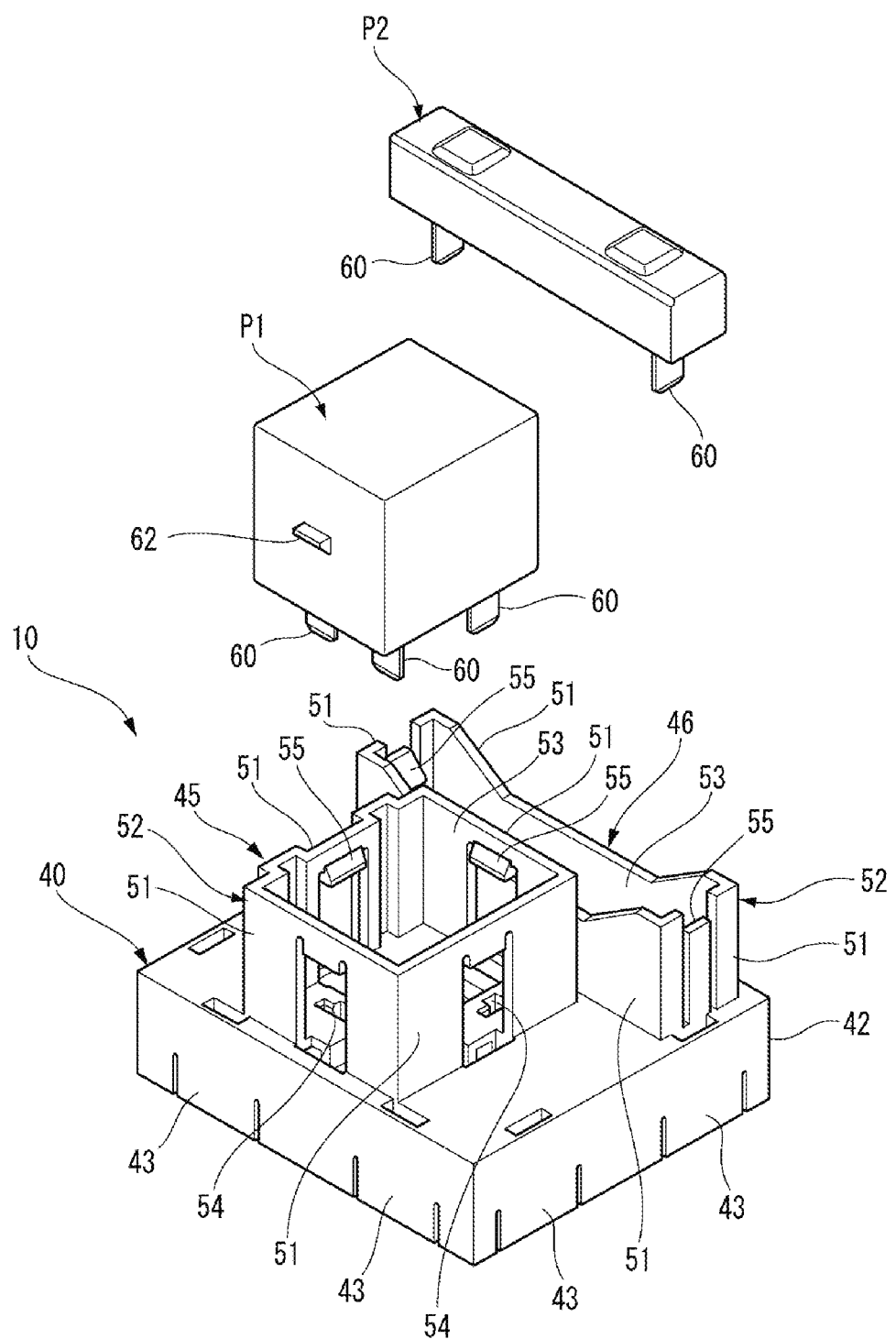
FIG. 2 is a perspective view of the electrical connection box and components according to the present embodiment.
Figure 3:
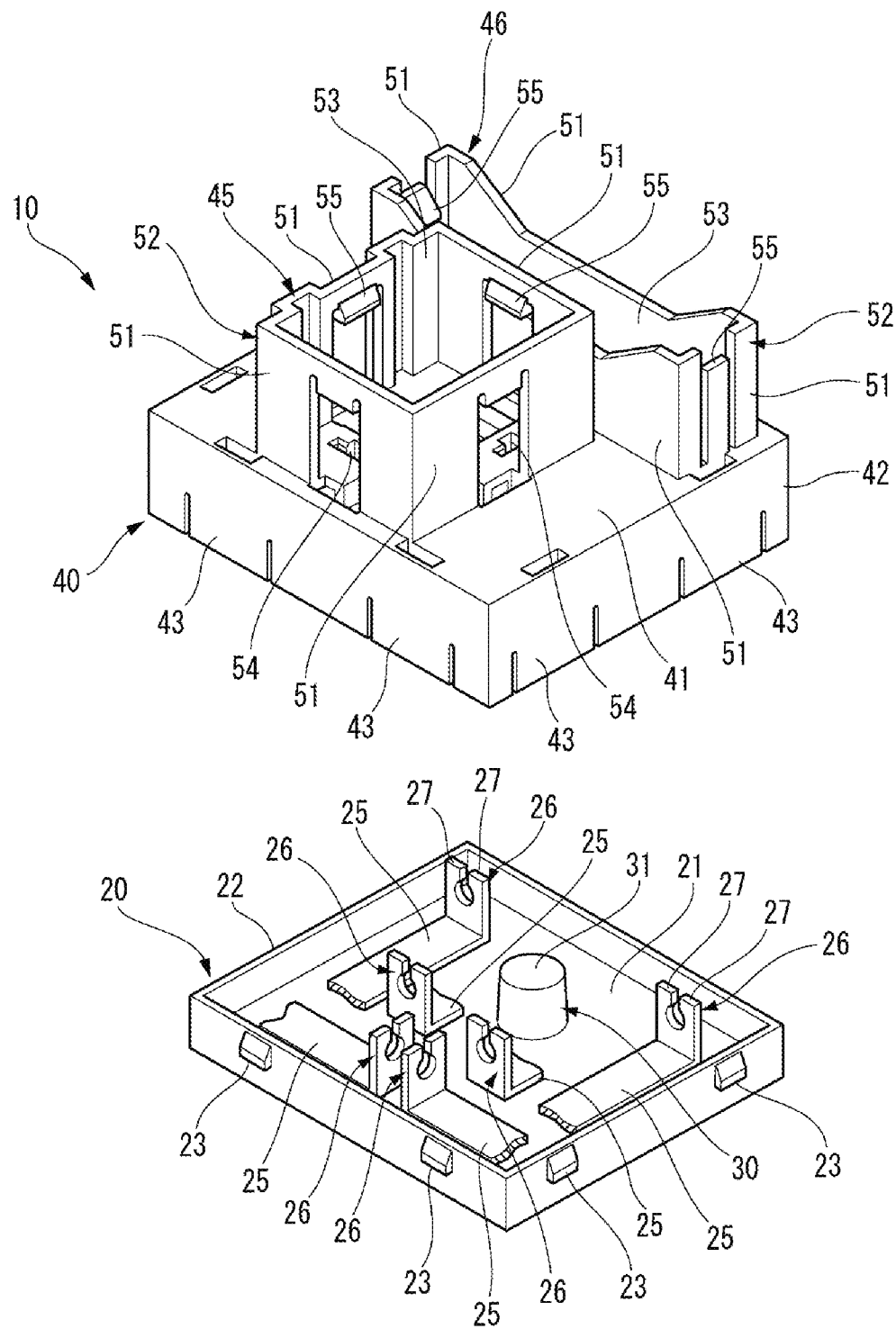
FIG. 3 is an exploded perspective view of the electrical connection box according to the present embodiment.
Figure 4:
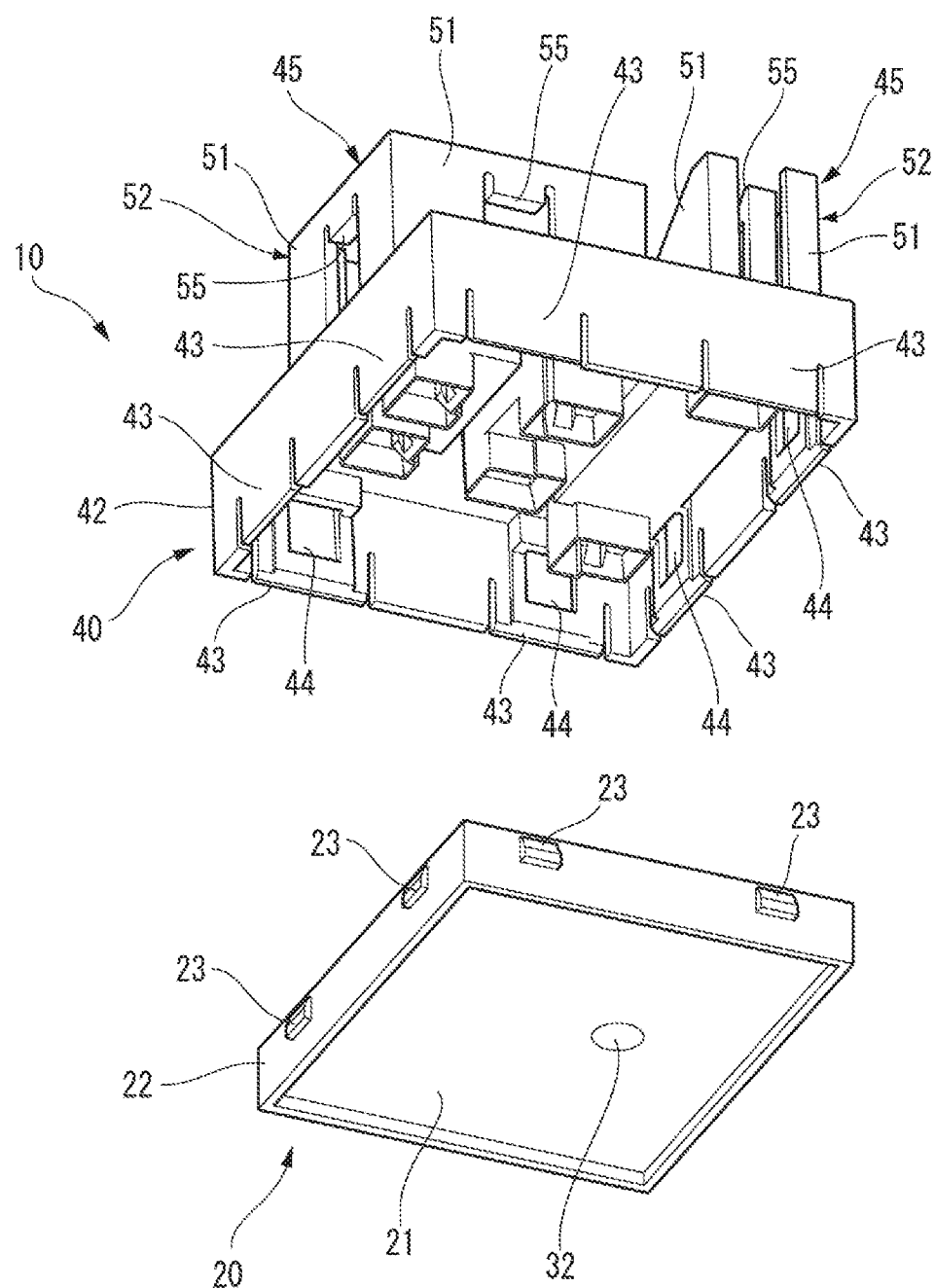
FIG. 4 is an exploded perspective view of the electrical connection box according to the present embodiment as viewed form below.
Figure 5A:
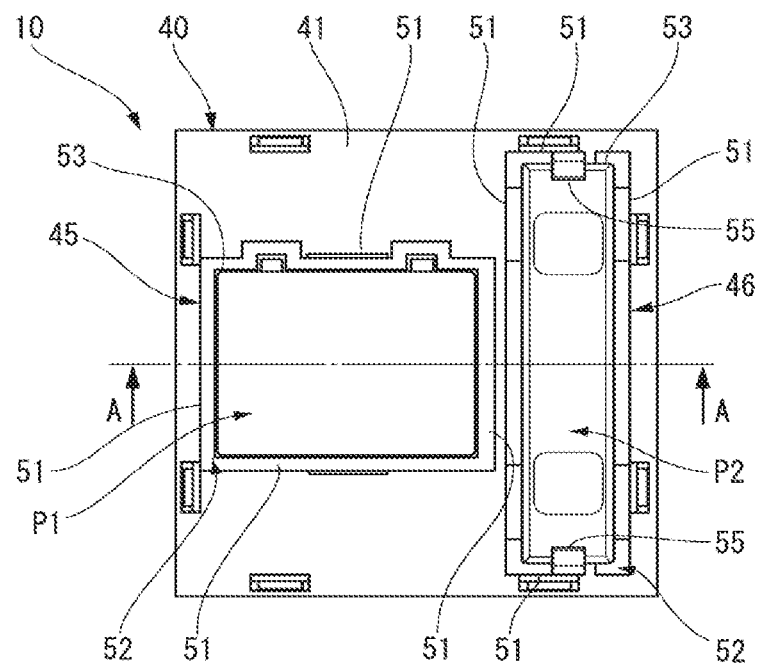
Figure 5B:
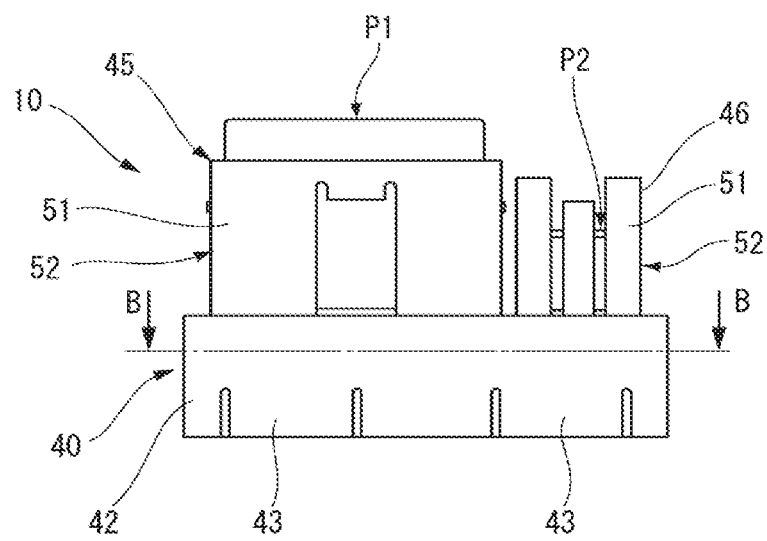
Figure 6A:
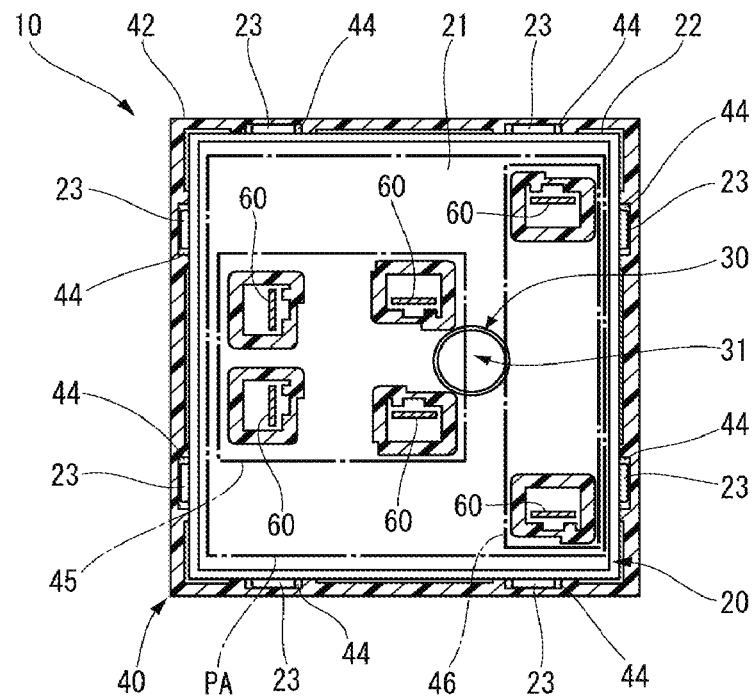
Figure 6B:
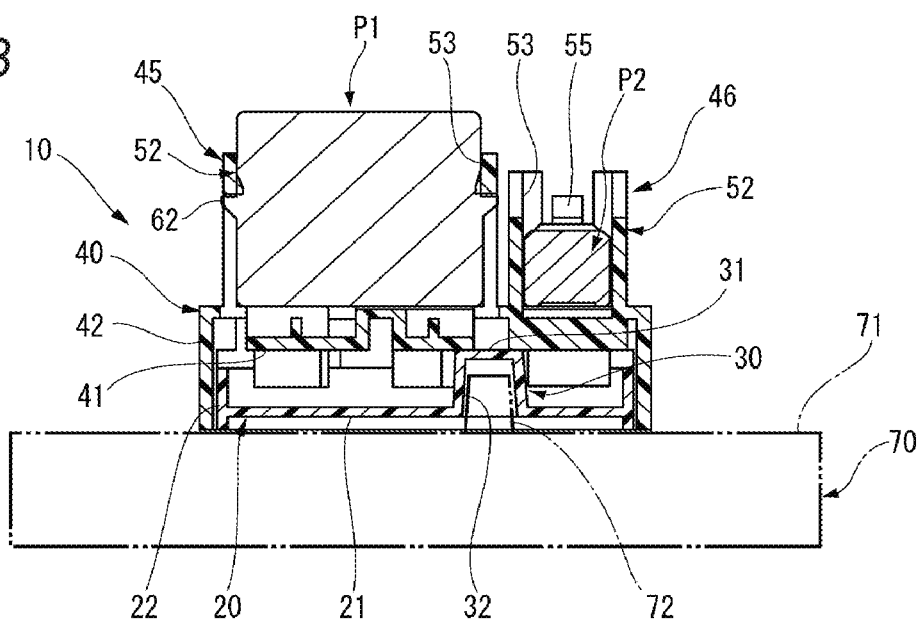

FIG. 1 is a perspective view of an electrical connection box according to the present embodiment. FIG. 2 is a perspective view of the electrical connection box and components according to the present embodiment. FIG. 3 is an exploded perspective view of the electrical connection box according to the present embodiment. FIG. 4 is an exploded perspective view of the electrical connection box according to the present embodiment as viewed form below. FIGS. 5A and 5B are views showing the electrical connection box, wherein FIG. 5A is a plan view, and FIG. 5B is a side view. FIGS. 6A and 6B are views showing an internal structure of the electrical connection box, wherein FIG. 6A is a cross-sectional view taken along a line B-B in FIG. 5B and FIG. 6B is a cross-sectional view taken along a line A-A in FIG. 5A.

As shown in FIGS. 1 to 5, an electrical connection box 10 according to the present embodiment includes a case 20 and a cover 40. The electrical connection box 10 is configured by assembling the cover 40 on the case 20 from above.

The case 20 is integrally formed of an insulating synthetic resin. The case 20 includes a bottom plate 21 and an outer wall portion 22. The bottom plate 21 is formed in a rectangular plate shape in the plan view. The outer wall portion 22 extends upward from an edge portion of each side of the bottom plate 21 and is formed integrally with the bottom plate 21. A plurality of locking claws 23 are formed on the outer wall portion 22 on an outer surface side thereof. The case 20 is provided with a plurality of bus bars 25 on an upper surface of the bottom plate 21. A tuning fork-shaped terminal connection portion 26 is formed on each of the bus bars 25. The terminal connection portion 26 includes a pair of clamping pieces 27.

The case 20 includes a boss 30. The boss 30 is formed integrally with the bottom plate 21 and protrudes upward from where the cover 40 is mounted. The boss 30 is formed in a circular shape in the plan view and is slightly reduced in diameter toward an upper side thereof. The boss 30 includes, on an upper end portion thereof, an abutting surface 31 which is a flat surface orthogonal to a protruding direction of the boss 30. The case 20 includes a positioning hole 32 on a back surface of the bottom plate 21. The positioning hole 32 is formed at a position corresponding to the boss 30. The positioning hole 32 is formed by hollowing out the boss 30. The boss 30 is not limited to the circular shape in the plan view, and may be other shapes such as an angled shape in the plan view.

The cover 40 to be mounted to the upper portion of the case 20 is integrally formed of an insulating synthetic resin. The cover 40 includes a top plate 41 and a side plate 42. The top plate 41 is formed in a rectangular plate shape in the plan view. The side plate 42 extends downward from an edge of each side of the top plate 41 and is formed integrally with the top plate 41. A plurality of locking pieces 43 are formed on the side plate 42, and locking recesses 44 are formed on inner surfaces of the locking pieces 43.

The cover 40 includes a plurality (two in this example) of component mounting portions 45, 46 on the top plate 41. The component mounting portion 45 is formed substantially in a square shape in the plan view, and the component mounting portion 46 is formed substantially in a rectangular shape in the plan view. The component mounting portions 45, 46 each include a peripheral wall portion 52 including four side plate portions 51 erected upward from an upper surface of the top plate 41, and a component fitting recess 53 is formed by an inside of the peripheral wall portion 52. Terminal insertion holes 54 (only terminal insertion holes 54 of the component mounting portion 45 is shown) are formed in a bottom surface portion of the component fitting recess 53 of each of the component mounting portions 45, 46.

A locking claw 55 protruding toward the component fitting recess 53 is formed on each side plate portion 51 of the peripheral wall portion 52 of the component mounting portion 45. A locking claw 55 protruding toward the component fitting recess 53 is formed on the side plate portion 51 on a short side of the peripheral wall portion 52 of the component mounting portion 46.

Components P1, P2 are assembled to the component mounting portions 45, 46 respectively. These components P1, P2 are, for example, electrical components such as a relay, a fuse, or a resistor, and terminals 60 protrude from a lower surface side of the component.

The component P1 is formed substantially in a cubic shape, and is assembled to the component mounting portion 45 by fitting the terminals 60 downward with respect to the component fitting recess 53 of the component mounting portion 45. Further, by assembling the component P1 to the component mounting portion 45, the terminals 60 of the component P1 are inserted into the terminal insertion holes 54 and protrude toward the back surface side of the top plate 41. A pair of claw portions 62 protruding to opposite sides are formed on side surfaces of the component P1. The component P1 is fitted into the component fitting recess 53 of the component mounting portion 45, and thus the claw portion 62 of the component P is locked to the locking claw 55. Accordingly, the component P1 is maintained in a state of being assembled to the component mounting portion 45.

The component P2 is formed substantially in a rectangular parallelepiped shape, and is assembled to the component mounting portion 46 by fitting the terminals 60 downward with respect to the component fitting recess 53 of the component mounting portion 46. Further, by assembling the component P2 to the component mounting portion 46, the terminals 60 of the component P2 are inserted into the terminal insertion holes 54 and protrude toward the back surface side of the top plate 41. The component P2 is fitted into the component fitting recess 53 of the component mounting portion 46, so that upper edges at both ends are locked by the locking claws 55. Accordingly, the component P2 is maintained in a state of being assembled to the component mounting portion 46.

The cover 40 is mounted and covered to the case 20 from above, and the side plate 42 of the cover 40 is disposed on an outer surface side of the outer wall portion 22 of the case 20. Further, by mounting the cover 40 to the case 20, the locking claws 23 of the outer wall portion 22 of the case 20 enter and are locked into the locking recesses 44 of the locking pieces 43 of the side plate 42. Accordingly, the cover 40 is maintained in a state of being mounted to the case 20.

In this state, as shown in FIG. 6A, the boss 30 is disposed between the component mounting portions 45, 46 in the plan view. Here, when an area within which an outer periphery of the component mounting portions 45, 46 is surrounded in the plan view is defined as a component mounting area PA, the boss 30 is disposed in the component mounting area PA. Further, when the cover 40 is mounted to the case 20, as shown in FIG. 6B, the abutting surface 31 of the boss 30 formed on the case 20 is abutted with the back surface of the top plate 41 of the cover 40. Accordingly, a distance between the bottom plate 21 of the case 20 and the top plate 41 of the cover 40 is maintained by the boss 30.

Next, a case of assembling the electrical connection box 10 and mounting the components P1, P2 will be described.

The case 20 is placed on a placement surface 71 of a jig 70. At this time, a positioning pin 72 erected on the placement surface 71 of the jig 70 is inserted into the positioning hole 32 formed on the back surface of the bottom plate 21 of the case 20 (with reference to FIG. 6B). Accordingly, the case 20 is maintained in a state of being positioned on the placement surface 71 of the jig 70.

The bus bars 25 are assembled to the case 20. At this time, since the case 20 is positioned and held on the placement surface 71 of the jig 70, the bus bars 25 can be assembled easily and smoothly.

The cover 40 is assembled to the case 20 in which the bus bars 25 are assembled. Specifically, the cover 40 is covered on the case 20 from above. Accordingly, the side plate 42 of the cover 40 is disposed on the outer surface side of the outer wall portion 22 of the case 20, and the locking claws 23 on the outer wall portion 22 of the case 20 are locked to the locking recesses 44 of the locking pieces 43 of the side plate 42 so as to fix the cover 40 to the case 20.

Next, the components P1, P2 are mounted to the component mounting portions 45, 46 of the cover 40 respectively. Specifically, the components P1. P2 with the terminals 60 facing downward are pushed into and fitted into the component fitting recesses 53 of the component mounting portions 45, 46, respectively. Then, the terminals 60 of each component P1, P2 are inserted into the terminal insertion holes 54, protrude to the back side of the top plate 41, and are inserted between the clamping pieces 27 of the terminal connection portions 26 formed on the bus bars 25 of the case 20. Accordingly, the terminals 60 of each component P1. P2 and the terminal connection portions 26 of bus bars 25 are electrically connected. In this state, the claw portions 62 of the component P are locked by the locking claws 55, the component P1 is maintained in a state of being assembled to the component mounting portion 45, the upper edges at both ends of the component P2 are locked by the locking claws 55, and the component P2 is maintained in a state of being assembled to the component mounting portion 46.

At this time, a large load from a pushing force of the components P1, P2 is applied to the top plate 41 of the cover 40, and this load is received by the boss 30 of the case 20.

Thus, according to the electrical connection box 10 of the present embodiment, the boss 30 for maintaining the distance between the bottom plate 21 of the case 20 and the top plate 41 of the cover 40 is arranged in the component mounting area PA within which the outer periphery of the plurality of component mounting portions 45, 46 is surrounded in the plan view. Accordingly, the load when assembling the components P1, P2 to the component mounting portions 45, 46 can be reliably received by the boss 30, and deformation such as bending of the cover 40 and the case 20 due to the load during assembly of the components P1, P2 can be satisfactorily prevented.

Therefore, the terminals 60 of each of the components P1, P2 can be smoothly and stably inserted into the terminal connection portions 26 of the case 20 with a preset insertion amount, and the connection reliability can be improved. The deformation of the cover 40 and the case 20 is prevented, thus disengagement of locking portions between the locking claw 23 and the locking piece 43 that lock the cover 40 and the case 20 can be prevented, and the assembled state of the cover 40 and the case 20 can be reliably maintained.

Since the component mounting portions 45, 46 respectively include the peripheral wall portions 52 by which the components P1, P2 to be assembled are surrounded, the peripheral wall portions 52 can satisfactorily hold peripheries of the components P1, P2 mounted on the component mounting portions 45, 46. Moreover, since the bending of the cover 40 is prevented, it is possible to prevent a problem that the peripheral wall portion 52 tilts and presses outer peripheral surfaces of the components P1, P2 as the top plate 41 of the cover 40 is deformed.

In the electrical connection box 10, the boss 30 is erected on the bottom plate 21 of the case 20, and the positioning hole 32 is formed on the back surface of the bottom plate 21 of the case 20 at a position corresponding to the boss 30. Therefore, the case 20 can be positioned on the placement surface 71 of the jig 70 by inserting the positioning pin 72 of the jig 70 into the positioning hole 32. Accordingly, assembling work of the bus bars 25 including the terminal connection portions 26 and the cover 40 to the case 20 and mounting work of the components P1, P2 to the component mounting portions 45, 46 can be performed smoothly. Moreover, since the positioning hole 32 is provided at a position corresponding to the boss 30, the positioning hole 32 can be formed by hollowing out the boss 30, and cost increase and space occupation due to the provision of a separate positioning hole 32 in the case 20 can be prevented. Due to a configuration in which the cover 40 is covered on the case 20, the case 20 can be easily positioned even when an outer peripheral surface of the case 20 cannot be positioned by abutting the positioning pin or the like.

Next, an electrical connection box according to a modification will be described.

(First Modification)

Figure 7A:
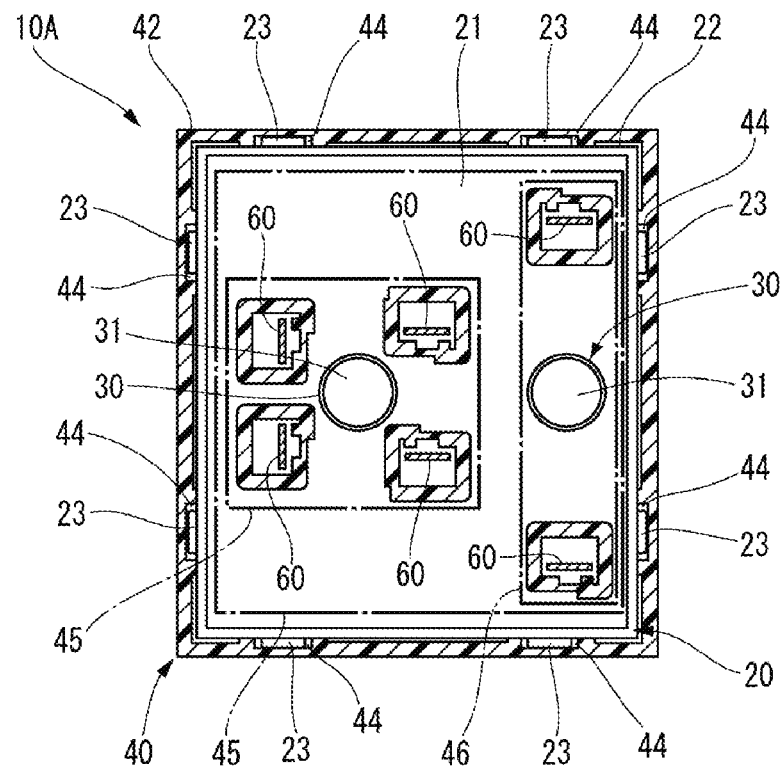
Figure 7B:
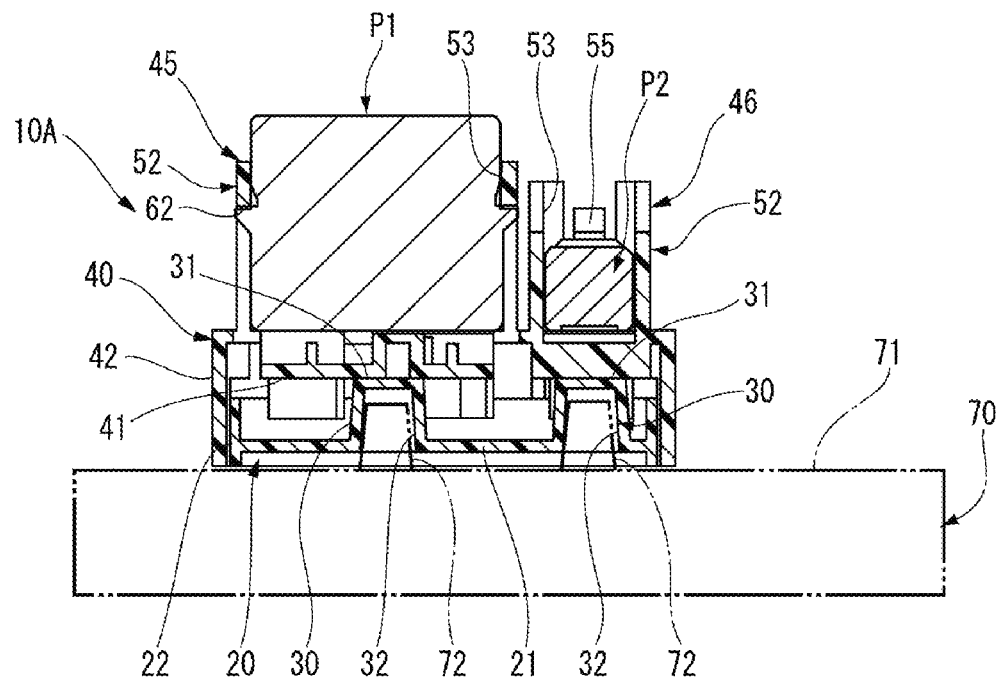

FIGS. 7A and 7B are views showing an internal structure of an electrical connection box according to a first modification, wherein FIG. 7A is a cross-sectional view taken along a line B-B in FIG. 5B, and FIG. 7B is a cross-sectional view taken along a line A-A in FIG. 5A.

As shown in FIGS. 7A and 7B, an electrical connection box 10A according to the first modification includes the same number of bosses 30 as that of the plurality of components P1, P2. These bosses 30 correspond to the component mounting portions 45, 46 on which the respective components P1, P2 are mounted and are provided on the case 20. Further, these bosses 30 are arranged respectively in ranges of the component mounting portions 45, 46 in the component mounting area PA in the plan view.

In the first modification, since the bosses 30 are arranged respectively in the ranges of the component mounting portions 45, 46 in the component mounting area PA in the plan view, when the components P1, P2 are assembled to the component mounting portions 45, 46, the load is received by the bosses 30 immediately below the components P1, P2. By inserting positioning pins 72 of the jig 70 into the positioning holes 32 of the two bosses 30 for positioning, the case 20 can be positioned on the placement surface 71 of the jig 70 with high precision and can be prevented from rotating. Accordingly, the assembly work of the electrical connection box 10A can be performed more smoothly.

(Second Modification)

Figure 8:
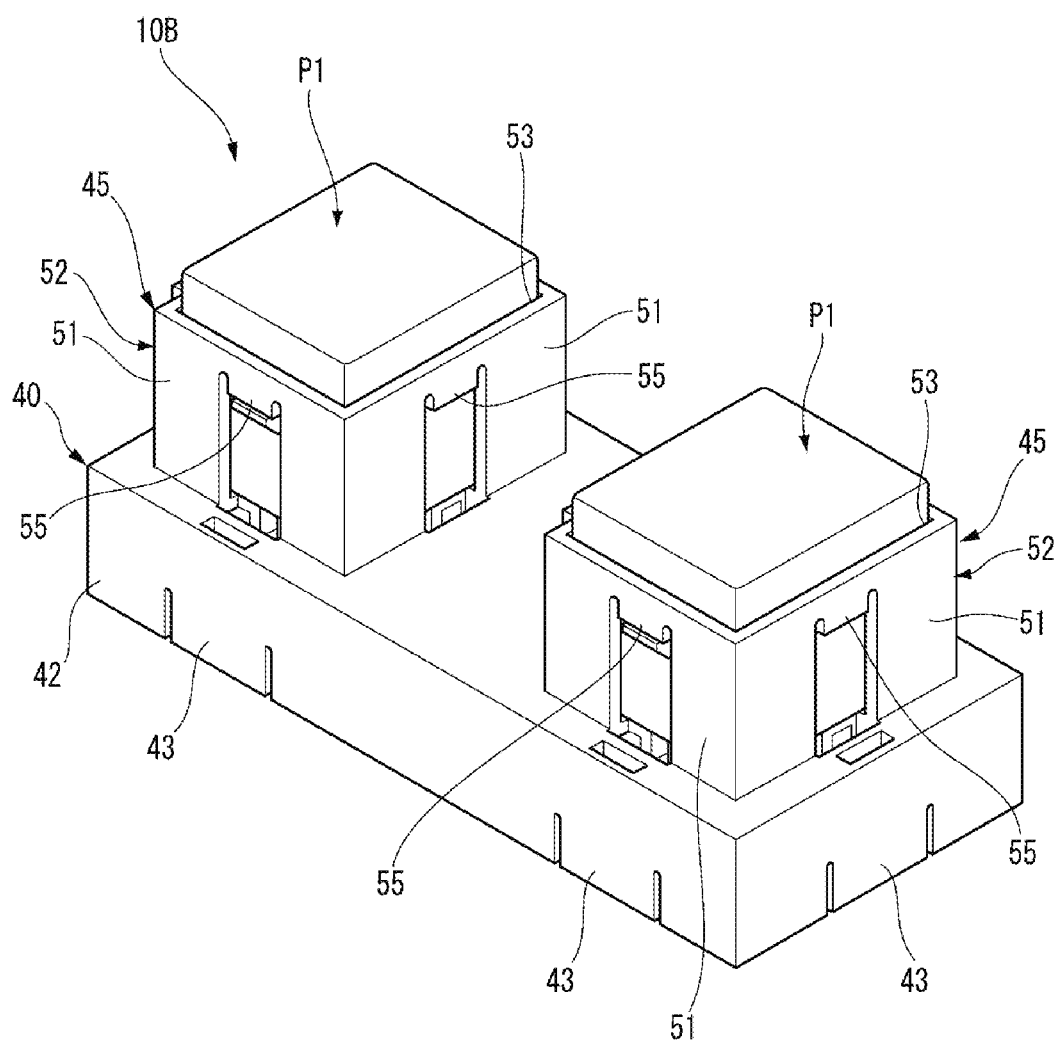
FIG. 8 is a perspective view of an electrical connection box according to a second modification.
Figure 9A:
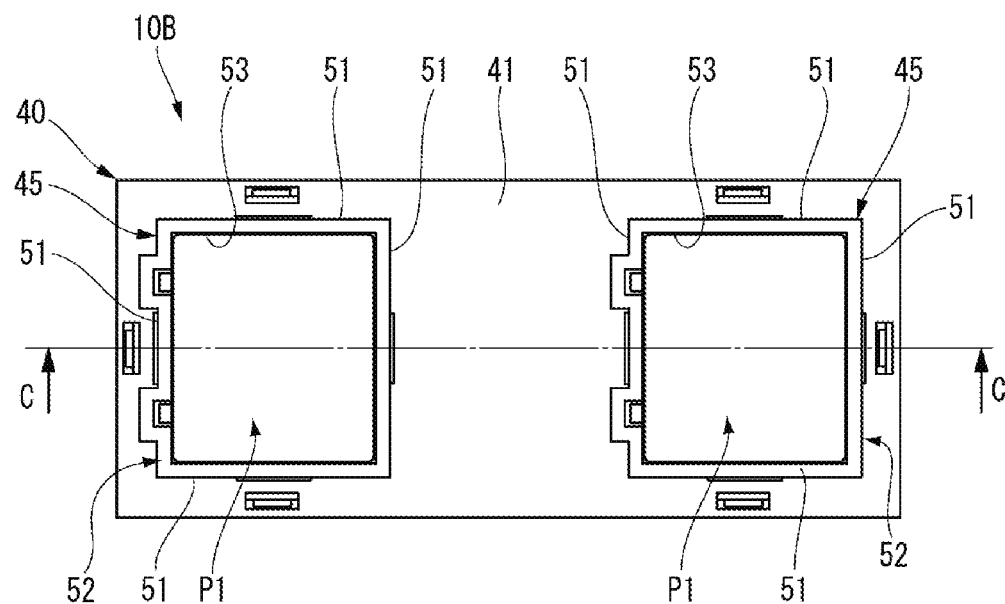
Figure 9B:
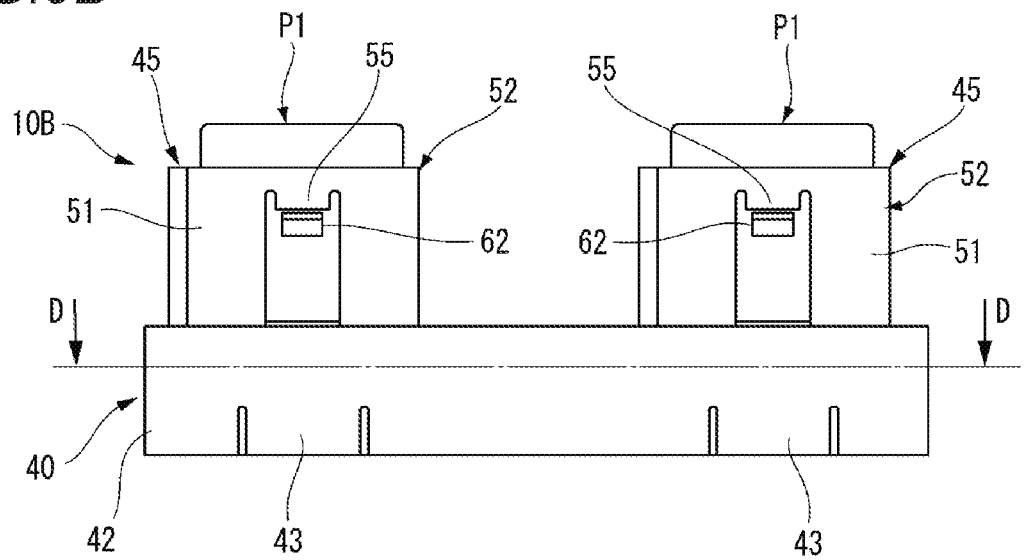
Figure 10A:
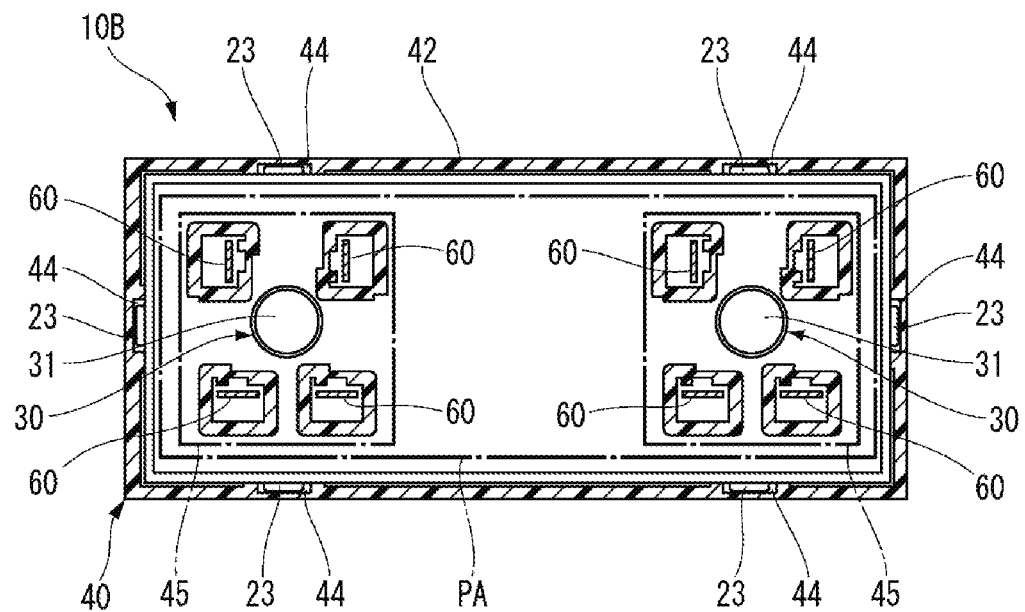
Figure 10B:
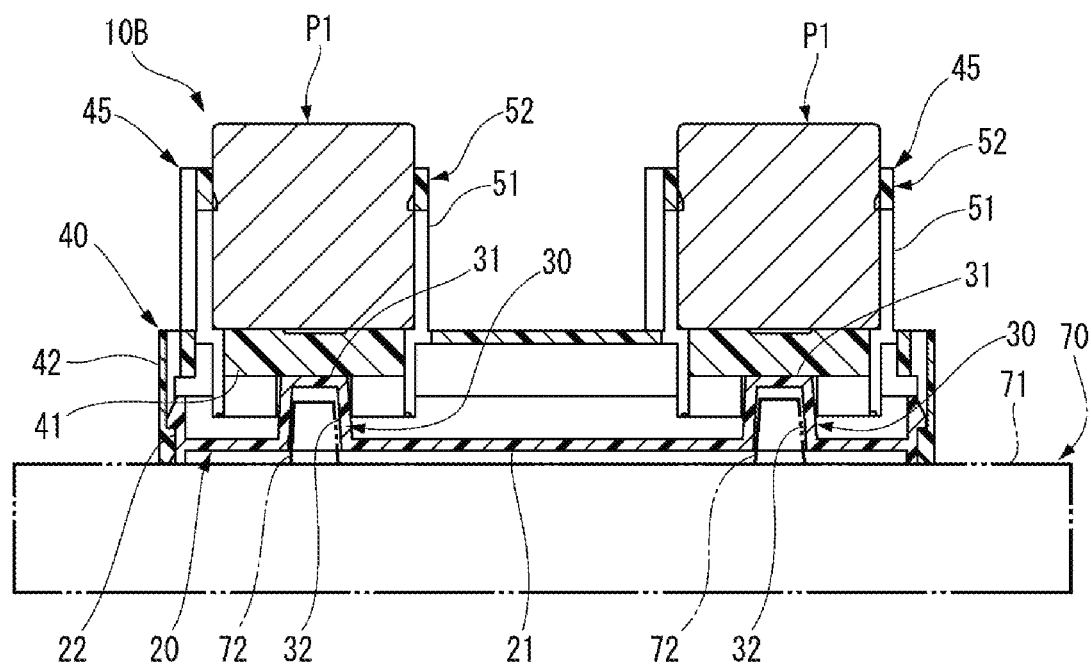

FIG. 8 is a perspective view of an electrical connection box according to a second modification. FIGS. 9A and 9B are views showing the electrical connection box according to the second modification, wherein FIG. 9A is a plan view, and FIG. 9B is a side view. FIGS. 10A and 10B are views showing an internal structure of the electrical connection box according to the second modification, wherein FIG. 10A is a cross-sectional view taken along a line D-D in FIG. 9B and FIG. 10B is a cross-sectional view taken along a line C-C in FIG. 9A.

As shown in FIG. 8 and FIGS. 9A and 9B, an electrical connection box 10B according to the second modification is formed in an elongated shape in the plan view. In the electrical connection box 10B, two component mounting portions 45 each having a substantially square shape in the plan view are provided on the cover 40 with a gap interposed therebetween. In the electrical connection box 10B, the boss 30 corresponding to each component mounting portion 45 is provided in the case 20. These bosses 30 are arranged respectively in ranges of the component mounting portions 45 in the component mounting area PA in the plan view.

Also in the second modification, since the bosses 30 are arranged respectively in the ranges of the component mounting portions 45 in the component mounting area PA in the plan view, when the components P1 are assembled to the respective component mounting portions 45, the load is received by the bosses 30 immediately below the components P1. By inserting positioning pins 72 of the jig 70 into the positioning holes 32 of the two bosses 30 for positioning, the case 20 can be positioned on the placement surface 71 of the jig 70 with high precision and can be prevented from rotating. Accordingly, the assembly work of the electrical connection box 10B can be performed more smoothly.

The invention is not limited to the embodiment described above, and modifications, improvements and the like can be made as appropriate. In addition, materials, shapes, dimensions, numerals, disposition locations or the like of constituent elements in the above-described embodiment are optional and not limited as long as the object of the present invention can be achieved.

For example, in the above embodiment, although the boss 30 protruding toward the cover 40 side is provided on the bottom plate 21 of the case 20, a boss protruding toward the case 20 side may be provided on the top plate 41 of the cover 40 to maintain the distance between the bottom plate 21 of the case 20 and the top plate 41 of the cover 40.

Here, characteristics of the embodiments of the electrical connection box according to the present invention described above are summarized briefly in the following [1] to [4], respectively.

[1] An electrical connection box (10) includes:
  a case (20) which includes a bottom plate (21) on which a terminal connection portion (26) is provided:
  a cover (40) which is assembled by being covered on an upper portion of the case (20) and includes a top plate (41); and
  a plurality of component mounting portions (45, 46) which are provided on the top plate (41) of the cover (40) and on each of which a component (P1, P2) including a terminal (60) is assembled from above the cover (40),
  wherein the terminal (60) of the component (P1, P2) assembled to the component mounting portion (45, 46) is connected to the terminal connection portion (26) of the case (20),
  wherein at least one boss (30) for maintaining a distance between the bottom plate (21) of the case (20) and the top plate (41) of the cover (40) is provided on the case (20) or the cover (40), and
  wherein the boss (30) is disposed in a component mounting area (PA) surrounded by an outer periphery of the plurality of component mounting portions (45, 46) in the plan view.

[2] In the electrical connection box described in [1], the boss (30) is disposed in a range of the component mounting portions (45, 46) in the plan view.

[3] In the electrical connection box described in [1] or [2], the component mounting portion (45, 46) includes a peripheral wall portion (52) by which a periphery of the component (P1, P2) to be assembled is surrounded.

[4] In the electrical connection box described in any one of [1] to [3], the boss (30) is erected on the bottom plate (21) of the case (20), and
  a positioning hole (32) is formed on a back surface of the bottom plate (21) of the case (20) at a position corresponding to the boss (30) so as to insert a positioning pin (72), which is provided on a jig (70) on which the case (20) is placed, into the positioning hole.

What is claimed is:
1. An electrical connection box comprising:
  a case which includes a bottom plate on which a terminal connection portion is provided;
  a cover which includes a top plate and is assembled by being covered on an upper portion of the case; and
  a plurality of component mounting portions which are provided on the top plate of the cover and on each of which a component including a terminal is assembled from above the cover, wherein the terminal of the component assembled to the component mounting portion is connected to the terminal connection portion of the case, wherein at least one boss for maintaining a distance between the bottom plate of the case and the top plate of the cover is provided on the case or the cover, and wherein the boss is disposed in a component mounting area surrounded by an outer periphery of the plurality of component mounting portions in a plane view.

2. The electrical connection box according to claim 1, wherein the boss is disposed in a range of the component mounting portions in the plan view.

3. The electrical connection box according to claim 1, wherein the component mounting portion includes a peripheral wall portion by which a periphery of the component to be assembled is surrounded.

4. The electrical connection box according to claim 1, wherein the boss is erected on the bottom plate of the case, and a positioning hole is formed on a back surface of the bottom plate of the case at a position corresponding to the boss so as to insert a positioning pin, which is provided on a jig on which the case is placed, into the positioning hole.

\* \* \* \* \*